US012530217B2

(12) United States Patent
Raindel et al.

(10) Patent No.: US 12,530,217 B2
(45) Date of Patent: Jan. 20, 2026

(54) SCHEDULING PAGE MIGRATIONS USING LATENCY TOLERANCE

(71) Applicant: Microsoft Technology Licensing, LLC, Redmond, WA (US)

(72) Inventors: Shachar Raindel, Redmond, WA (US); Daniel Sebastian Berger, Seattle, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 782 days.

(21) Appl. No.: 17/853,655

(22) Filed: Jun. 29, 2022

(65) Prior Publication Data

US 2024/0004683 A1 Jan. 4, 2024

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
CPC ......... G06F 9/45558; G06F 2009/4557; G06F 2212/657; G06F 12/1009; G06F 12/1036; G06F 2009/45583
See application file for complete search history.

(56) References Cited

U.S. PATENT DOCUMENTS

| | | | | |
|---|---|---|---|---|
| 2009/0327774 A1* | 12/2009 | Jeyaseelan | .............. | G06F 1/325 710/316 |
| 2017/0269951 A1* | 9/2017 | Gupta | .................. | G06F 3/0613 |
| 2018/0329737 A1* | 11/2018 | Dong | .................. | G06F 9/45558 |
| 2019/0227949 A1* | 7/2019 | Bernat | ................ | G06F 11/3476 |
| 2021/0067451 A1* | 3/2021 | Duenas | ................ | G06F 13/385 |

* cited by examiner

*Primary Examiner* — Bradley A Teets
*Assistant Examiner* — Miguel Angel Rodriguez Delgado
(74) *Attorney, Agent, or Firm* — Barta Jones, PLLC

(57) ABSTRACT

Solutions for scheduling page migrations use latency tolerance of coupled devices, such as external peripheral devices (e.g., network adapters), to prevent buffer overflows or other negative performance. A latency tolerance of a device coupled to a virtual object, such as a virtual machine (VM) is determined. This may include the device exposing its latency tolerance using latency tolerance reporting (LTR). When a page migration for the virtual object is pending, a determination is made whether sufficient time exists to perform the page migration, based on at least the latency tolerance of the device. The page migration is performed if sufficient time exists. Otherwise, the page migration is delayed. In some examples, latency tolerances of multiple devices are considered. In some examples, multiple page migrations are performed contemporaneously, based on latency tolerances. Various options are disclosed, such as the page migration being performed by the virtual object software or the device.

20 Claims, 9 Drawing Sheets

SCHEDULING PAGE MIGRATIONS USING LATENCY TOLERANCE

BACKGROUND

If an application does not access a particular memory page for a long period of time or an application is access latency tolerant or for other reasons, the memory page may be moved to a lower tier memory (e.g., slower memory). Later, when the memory page is accessed again (e.g., the memory becomes hot again), it may be migrated back to higher tier memory (e.g., faster memory). In such scenarios, the page migration among tiers can reduce the latency of memory accesses after the migration. During the page migration, access to the memory page is suspended. Further, when the memory page is used as a read/write destination (e.g., via DMA) for a peripheral device, the peripheral device must either pause operations or else input/output (I/O) data streams must be buffered.

For some scenarios, such as applications executing within virtual machines (VMs) interfacing with devices that receive data from external, uncontrolled sources (e.g., VM applications using network adapters), pausing may not be available. Thus, buffering may be required. However, if the device runs out of buffer space before a page migration has completed, a buffer overflow may occur. Data may be dropped from the buffer and lost. This causes delays when messages require retransmission, or some other process is used to restore the lost data.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Example solutions for scheduling page migrations using latency tolerance include: determining a latency tolerance of a first device coupled to a virtual object; determining a pendency of a page migration of a memory page for the virtual object; based on at least the latency tolerance of the first device, determining that sufficient time exists to perform the page migration; and based on at least determining that sufficient time exists to perform the page migration, performing the page migration.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
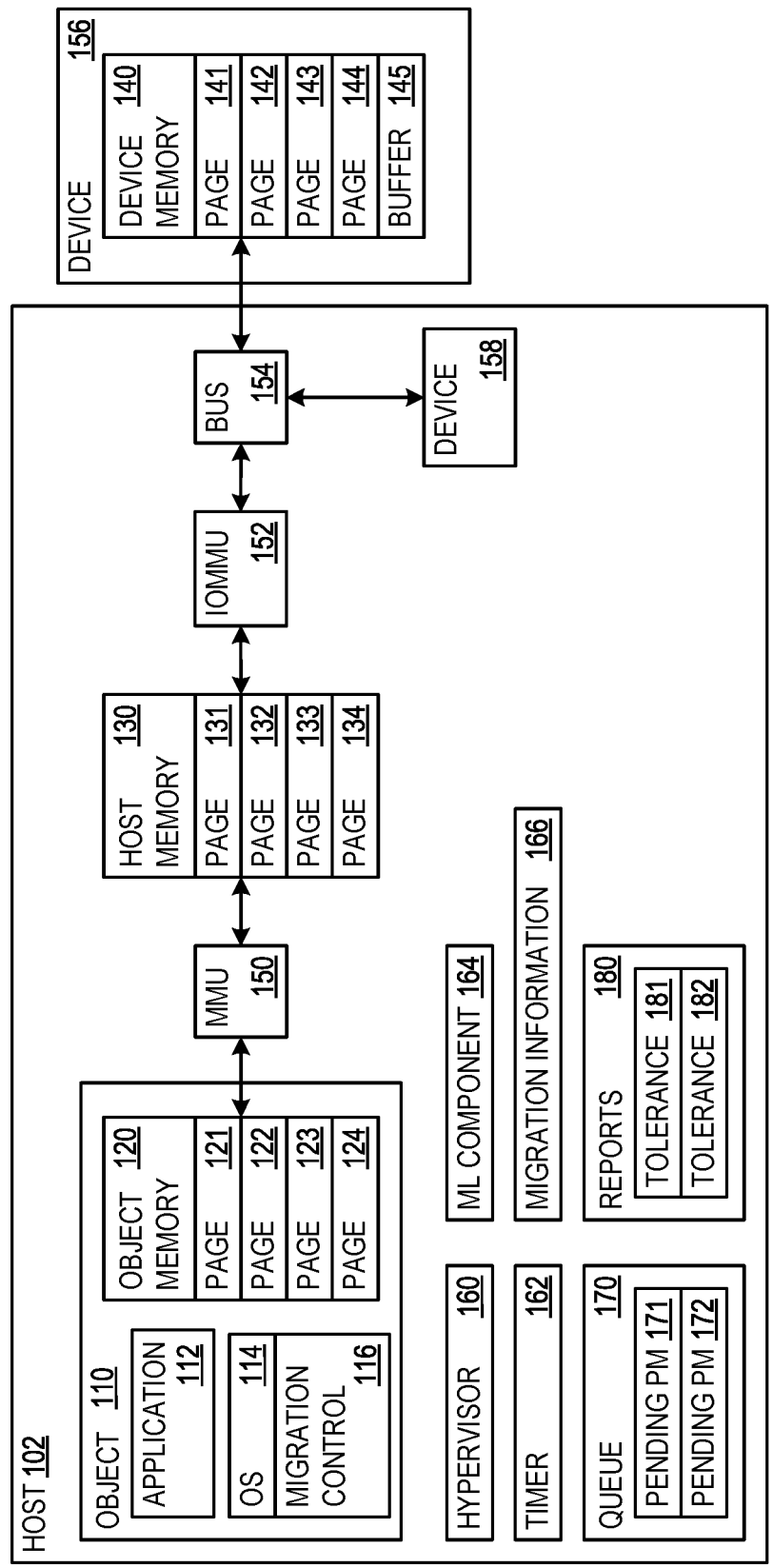
FIG. 1 illustrates an example architecture that advantageously schedules page migrations using latency tolerance.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Disclosed solutions for scheduling page migrations use latency tolerance of coupled devices, such as external peripheral devices (e.g., network adapters), in order to prevent buffer overflows. A latency tolerance of a device coupled to a virtual object, such as a virtual machine (VM) is determined. This may include the device exposing its latency tolerance using latency tolerance reporting (LTR). When a page migration for the virtual object is pending, a determination is made whether sufficient time exists to perform the page migration, based on at least the latency tolerance of the device. The page migration is performed if sufficient time exists, meaning that a buffer overflow is either not expected at all or expected with no higher than a threshold level of probability. Otherwise, the page migration is delayed. In some examples, latency tolerances of multiple devices are considered. In some examples, multiple page migrations are performed contemporaneously, based on latency tolerances. Various options are disclosed, such as the page migration being performed by the virtual object software or the device.

Page migration flows are important for many cloud scenarios, including memory defragmentation, memory disaggregation and mitigation of physical memory failures. In such scenarios, the memory migration may be impactful if it degrades application performance. Hiding any side effects of page migrations, without performance implications improves user experience. If page migrations are performed blindly, without regard to affected peripheral devices' tolerance for pauses, page migration may significantly impact performance, causing packet loss or delaying computation processes. Thus, aspects of the disclosure avoid negatively impacting performance by leveraging indications from affected peripheral devices of their tolerance for pauses to delay migration until a point in time when the devices are able to sustain the pause.

Aspects of the disclosure improve the operations of computing devices, for example the speed and reliability of virtualization, by performing the page migration based on determining that sufficient time exists to perform a page migration. By leveraging latency tolerance information, page migrations may be performed opportunistically, without negatively impacting the operation of applications on virtual objects and while mitigating risks of running out of buffer space. Pausing applications slows down operations of computing devices and may result in violations of platform-level; availability goals. Running out of buffer space may result in data losses, requiring repeating messaging or replaying certain operations, also slowing down operations of computing devices. By avoiding these two causes of slow-down, aspects of the disclosure provide a useful, practical result.

FIG. 1 illustrates an example architecture 100 that advantageously schedules page migrations using latency tolerance. An application 112, executing in a virtual object 110, such as a VM, on a host 102, uses object memory 120 within virtual object 110. Object memory 120 has multiple memory pages, such as a memory page 121, a memory page 122, a memory page 123, and a memory page 124. In general, a memory page is a fixed-length contiguous block of virtual memory, described by a single entry in a page table, and is the smallest unit of data for memory management in a virtual memory operating system (OS). Memory page size is commonly an integer power of two, typically 512 bytes to 8192 bytes, with 4096 bytes being common. Virtual object 110 has its own OS 114 and is managed, along with possibly other virtual objects (e.g., VMs) by a hypervisor 160.

Memory pages 121-124 in object memory 120 are mapped to memory pages 131-134 in a host memory 130, by a memory management unit (MMU) 150. Memory pages 131-134 may be located in different portions of host 102, and thus may have different latency. For example, memory page 131 may be the fastest memory to access, whereas memory page 132 and memory page 133 may be slightly slower random access memory (RAM), and memory page 133 may be in secondary storage (even slower to access). Hot pages (e.g., frequently accessed) of memory pages 121-124 will be mapped to one of memory pages 131-133, whereas one of memory pages 121-124 that has not been accessed for a long time will be mapped to memory page 134.

A bus 154 hosts two peripheral devices 156 and 158. In some examples, bus 154 comprises a peripheral component interconnect express (PCIe) and devices 156 and 158 are PCIe devices. Device 156 is illustrated as being external to host 102 and device 156, which may be configured similarly to device 156, is illustrated as being internal to host 102. Either configuration may be supported by some examples. Devices 156 and/or 158 may be any of a network adapter, such as a network interface card (NIC), an audio device (e.g., a sound card), a video device (e.g., a graphics card, video capture card), and a media controller (e.g., disk controller, disk array controller).

Some examples of architecture 100 may use direct memory access (DMA), which allows certain hardware subsystems to access main system memory independently of a central processing unit (CPU). Device 156 has a device memory 140, with multiple memory pages 141-144, some of which may be mapped to one or more of memory pages 131-134 in host memory 130, by an input-output (I/O) MMU (IOMMU) 152. IOMMU 152 connects (DMA-capable) bus 154 to host memory 130 by translating between I/O virtual addresses (IOVA) and physical memory addresses of host memory 130. Some examples of architecture 100 may use single root I/O virtualization (SR-IOV) to allow for isolation of PCIe resources for manageability and performance reasons. Using SR-IOV, a single physical PCIe bus (e.g., bus 154) may be shared in a virtual environment, permitting device 156 (and also device 158) to present itself as multiple virtual devices to hypervisor 160. Some examples may use kernel-bypass.

In some examples, memory page 141 may be mapped to a memory page of host memory 130 in common with a memory page of object memory 120. In this way, virtual object 110 is coupled to device 156 through host memory 130. In some examples, virtual object 110 is also coupled to device 158 through host memory 130. Memory page 142, memory page 143, and memory page 144 of device memory 140 may each be mapped to memory pages in common with other virtual object memories. Device 156 also has a buffer 145 to hold I/O data streams when access to a mapped physical memory page in host 102 is suspended.

A migration control 116 performs the control of page migrations as described herein. Although migration control 116 is illustrated as being a single entity located within virtual object 110, it should be understood that migration control 116 may be located elsewhere and/or distributed in multiple locations, for example, migration control 116 may be located within OS 114, partially within application 112, or within hypervisor 160.

A page migration queue 170 identifies pending page migrations that have been triggered by a memory page of object memory 120 being identified as hot (or not). For example, a pending page migration 171 identifies that memory page 121 (which in this example has become hot) is to migrate from the location of memory page 134 to the location of memory page 131. If memory page 142 (of device 156) is also mapped commonly with memory page 121 (of virtual object 110), access to host memory 130 will be paused during the page migration (identified as pending page migration 171). A pending page migration 172 for a different memory page (e.g., one of memory pages 122-124) is also pending in page migration queue 170.

A latency tolerance report list 180 identifies latency tolerances of peripheral devices. A latency tolerance in some examples is an amount of time that a device can pause before the operation of that device or performance targets are negatively impacted. For example, a latency tolerance 181 indicates the tolerance of device 156 to pauses (e.g., without an excessive risk of over-running buffer 145 or missing latency targets for network transfers), and a latency tolerance 182 indicates the tolerance of device 158 to pauses. In some examples, latency tolerance report list 180 is stored in defined registers, and incoming updates use interrupts. Migration control 116 attempts to perform the page migrations identified in page migration queue 170, subject to sufficient time existing to complete the page migration in view of latency tolerance 181 and, if virtual object 110 is also coupled to device 158, latency tolerance 182.

Determining whether sufficient time exists is a probabilistic determination in which the answer may not be certain, but is instead subject to a degree of confidence. This is because determinations of both the expected page migration operation duration and the latency tolerance are subject to estimations and assumptions and so should be interpreted as values that are correct only a percentage of the time. For example, latency tolerances may be based on an assumption that incoming data will be limited to a certain data rate. While this may be safe for audio streaming, bursty network traffic may violate that assumption, unexpectedly dropping the latency tolerance. Expected page migration operation durations may be based on historical write times for a physical media, which may change abruptly when file fragmentation becomes high.

Certainties may be expressed using a given time and a confidence value, such as X milliseconds (ms) at Y %, or as a given time with a percentile, such as the $N^{th}$ percentile is X ms. In some examples, the latency tolerance may not be expressed with a confidence or percentage, and only the expected page migration operation duration is provided with a probabilistic value. Determination of whether sufficient time exists may be based on a two-phased determination of (1) does the expected page migration operation duration exceed the latency tolerance, and (2) is the confidence sufficiently high.

If the expected page migration operation duration does not exceed the latency tolerance, there is insufficient time. However, if the expected page migration operation duration does exceed the latency tolerance, but the confidence is below some minimum threshold, then there is also insufficient time. A blended determination may be that when the confidence is not high, a minimum margin must exist between the expected page migration operation duration and the latency tolerance.

Some examples are provided: (1) A fixed $90^{th}$ percentile is used for all reported page migration durations, and this risk level is acceptable. Therefore, if the expected page migration operation duration exceeds the latency tolerance, there is sufficient time. (2) A fixed $50^{th}$ percentile is used for all reported page migration durations, and this risk level is not fully acceptable. Therefore, if the expected page migration operation duration exceeds the latency tolerance by Z ms, there is sufficient time. (3) The expected page migration operation duration is reported along with a confidence value. If the confidence value exceeds a first minimum confidence threshold (e.g., 75%) all that is needed for there to be sufficient time is that the expected page migration operation duration exceeds the latency tolerance. (4) The expected page migration operation duration is reported along with a confidence value. If the confidence value does not exceed a first minimum confidence threshold (e.g., 75%), but does exceed a second minimum confidence level (e.g., 50%) then a time margin is added to the expected page migration operation duration. If this value exceeds the latency tolerance, then there is sufficient time.

Some examples use a machine learning (ML) component 164 to determine what constitutes sufficient time for a page migration, reported page migration durations, percentiles, and/or confidence values, in view of historical reported values and results. As is typical with ML decision-making, there may be limited visibility into the exact decision-making criteria settled upon by training ML component 164, and the criteria may change over time as ML component 164 is further trained. However ML component 164 (or migration control 116) determines what qualifies as sufficient, there is a determination that is acted upon by migration control 116.

Some examples of architecture 100 use latency tolerance reporting (LTR), which is also used for power saving functionality. In LTR, endpoints (e.g., devices 156 and 158) send information about their service latency requirements for memory reads and writes to the root complex such that central platform resources (such as host memory 130, snoop resources, and other resources associated with the root complex) may be power managed with minimal risk of impacting endpoint functionality and performance.

Some examples of architecture 100 use a timer 162 to time a delay so that, when migration control 116 determines that there is insufficient time to complete a page migration, migration control 116 will wait until completion of timer 162 and check again. In some examples, a page migration may only be delayed for a maximum period of time, before it is forced, even with the risk of over-running buffer 145. In some examples, this maximum period of time may be on the order of minutes. In some examples, for more urgent page migrations, the maximum period of time may be on the order of seconds. Pending page migrations 171 and 172 may specify a maximum delay time, in some examples.

Some examples of architecture 100 use ML component 164 to estimate what constitutes sufficient time for a page migration, or a set of contemporaneous page migrations, using prior page migration information in a page migration history (e.g., page migration information 166). This results in continuous improvement of architecture 100. There is a balance between delaying page migrations too long (being overly risk averse), which extends the period of time that application 112 is using slower memory thereby degrading the performance of application 112, and being overly aggressive in rushing page migrations, which will result in buffer-overflows and resulting recovery delays.

ML component 164 learns what constitutes sufficient time for a page migration, as described in relation to FIG. 7, and in some examples, stores this information for later determination by migration control 116 (as described in relation to FIGS. 3-6). In some examples, the sensitivity of a device to a particular reported latency may depend on the device type. For example, a NIC may have a greater risk of a buffer overflow, due to the unpredictable nature of incoming data traffic, than an audio device operating with a slower and more predictable data stream. In some examples, ML component 164 also learns what constitutes sufficient time for a page migration involving multiple devices with different latency tolerances. In some examples, ML component 164 also learns whether multiple page migrations may be scheduled contemporaneously, for a given latency tolerance, and the count of the feasible contemporaneous page migrations.

Figure 2:
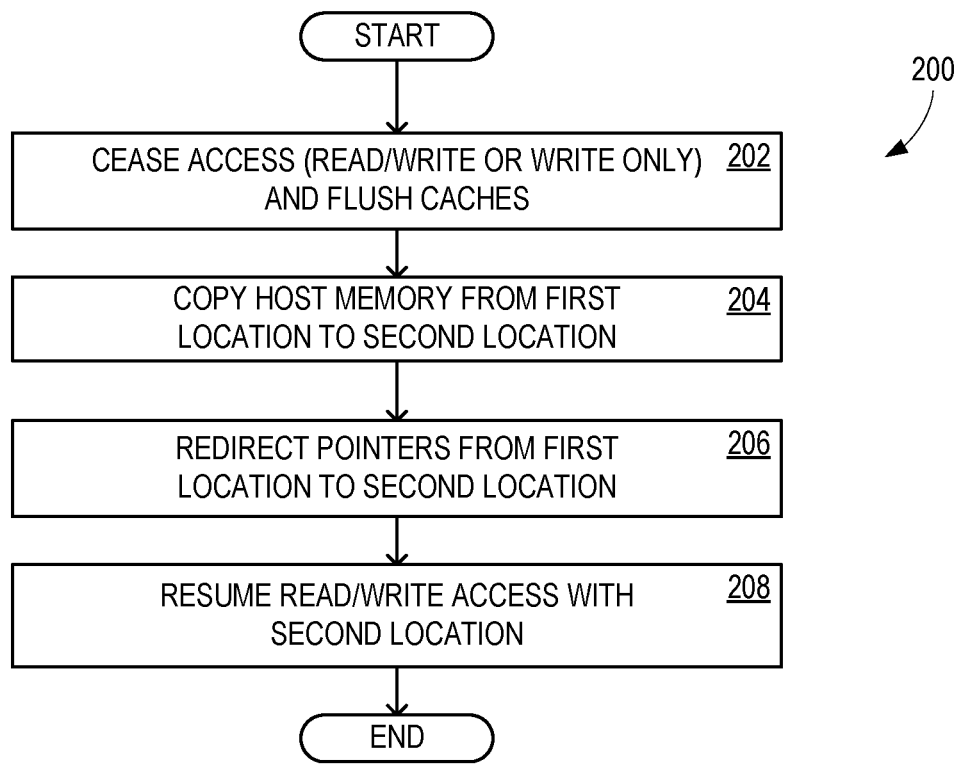
FIG. 2 shows a flowchart illustrating exemplary page migration operations that may be performed using examples of the architecture of FIG. 1.

FIG. 2 shows a flowchart 200 illustrating exemplary page migration operations that may be performed using examples of architecture 100. In some examples, operations described for flowchart 200 are performed by computing device 900 of FIG. 9. FIGS. 2-6 are described for a page migration scenario in which memory page 121 (in object memory 120 of virtual object 110) and memory page 142 (in device memory 140 of device 156) are each mapped to memory page 134 (of host memory 130). Pending page migration 171 identifies that memory page 134 is to migrate to the location of memory page 131. In this scenario, memory page 131 is available for over-writing.

Flowchart 200 commences with operation 202, which ceases access to memory page 134 by virtual object 110 and device 156. In some examples both read and write operations are suspended. In some examples, read operations are permitted to continue, for at least some period of time. Caches are flushed, to ensure that no transactions are lost, and then flowchart 200 commences with operation 204 to copy the contents of memory page 134 to memory page 131.

Operation 206 redirects pointers in MMU 150 and IOMMU 152 from memory page 134 to memory page 131, and operation 208 resumes access by virtual object 110 and device 156. Each of flowcharts 300-600, of FIGS. 3-6 respectively, uses the operations of flowchart 200 for page migrations.

Figure 3:
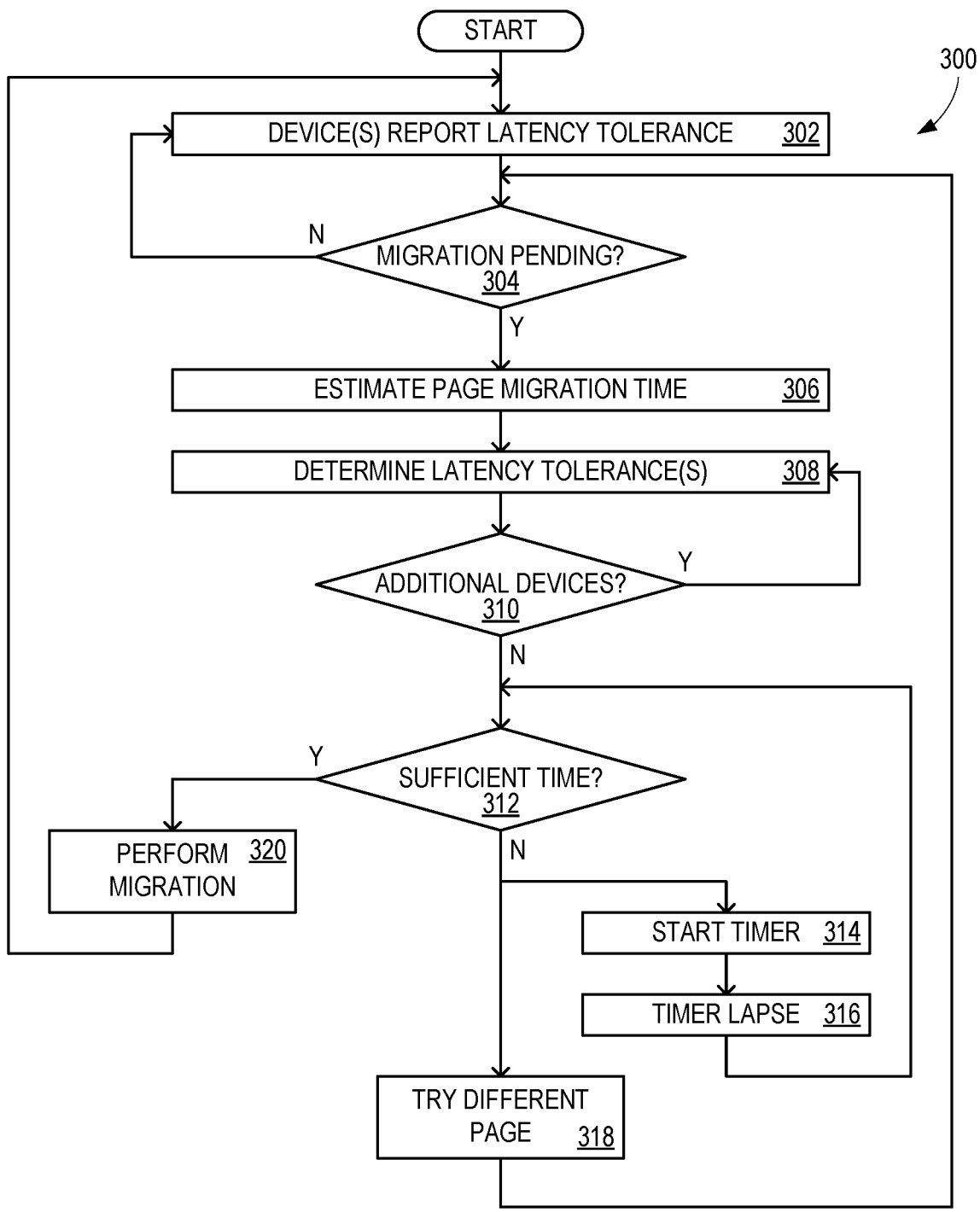
FIGS. 3-6 show flowcharts illustrating exemplary page migration operations using latency tolerance, as may be performed using examples of the architecture of FIG. 1.

FIG. 3 shows a flowchart 300 illustrating exemplary page migration operations using latency tolerance, as may be performed using examples of architecture 100. In some examples, operations described for flowchart 300 are performed by computing device 900 of FIG. 9. Flowchart 300 is used for scenarios of one or multiple devices coupled to virtual object 110 (e.g., device 156 and, in some cases also device 158), the coupled devices pushing their latency tolerances to latency tolerance report list 180, the decision of proceeding with the page migration being performed by software (e.g., application 112, OS 114, or hypervisor 160), and software (e.g., application 112, OS 114, or hypervisor 160) performing the page migration.

Flowchart 300 commences with operation 302, which includes reporting, by device 156, latency tolerance 181 of device 156, and reporting, by device 158, latency tolerance 182 of device 158. Each device exposes its latency tolerance on an ongoing basis. In some examples, operation 302 comprises, based on a trigger condition, reporting, by device 156, latency tolerance 181 of device 156, with the trigger condition comprising lapse of a timer. In some examples, reporting latency tolerance 181 of device 156 comprises sending an interrupt signal. In some examples, the report by device 156 comprises a LTR report.

Decision operation 304 determines whether there is a pendency of a page migration of a memory page for virtual object 110, for example a pending page migration 171 identifies that memory page 121 in page migration queue 170 is to be migrated. In some examples, page migration queue 170 is sorted so that the most urgent page migrations are addressed first. Until there is a pending page migration, flowchart 300 loops back to operation 302.

When there is a pending page migration, operation 306 estimates an amount of time required for the page migration, based on at least a prior page migration (e.g., in page migration information 166). In some examples, an estimation had previously been performed by ML component 164 (see FIG. 7), and migration control 116 merely looks up the results the results during operation 306. In operation 308, a migration control 116 (e.g., located within any of application 112, OS 114, hypervisor 160, or another software component) determines latency tolerance 181 of device 156 coupled to virtual object 110. In some examples, this is merely pulling latency tolerance 181 from wherever latency tolerance report list 180 is stored in memory (e.g., one or more registers, or some other memory location). If more than a single device is coupled to virtual object 110, and/or would otherwise be affected by a page migration for virtual object 110, migration control 116 scans through each relevant latency tolerance. This is shown using decision operation 310, in which the existence of an additional device returns flowchart to operation 308 for determining latency tolerance 182 of device 158.

Decision operation 312 determines whether sufficient time exists to perform the page migration. In some examples, this is based on at least latency tolerance 181 of device 156 and latency tolerance 182 of device 158. In some examples, the most restrictive one of latency tolerance 181 of device 156 and latency tolerance 182 of device 158 is used. In some examples, an average of latency tolerances of a plurality of devices coupled to virtual object 110 is used; the average may be mean, median, or mode. Some examples use a weighted combination of latency tolerance 181 of device 156 and latency tolerance 182 of device 158 (e.g., learned by ML component 164).

Some examples further determine whether sufficient time exists to perform a plurality of page migrations contemporaneously, for example performing a second page migration contemporaneously with the first page migration (e.g., the page migrations identified as pending page migration 171 and 172 are both performed). Some examples further determine a count of a plurality of page migrations that may be performed contemporaneously. This is described in further detail in relation to FIG. 7.

If there is insufficient time, flowchart 300 either moves to operation 314 or 318. Operation 314 starts timer 162, based on at least determining that sufficient time does not exist to perform the page migration. Timer 162 lapses in operation 316, and flowchart 300 moves back to decision operation 312 to, based on a lapse of timer 162, determine whether sufficient time exists to perform the page migration. Alternatively, some examples move to operation 318 to try a different page migration, and back up to decision operation 304 to determine a pendency of a different page migration of a memory page for virtual object 110.

If, however, there is sufficient time, decision operation 312 determines that sufficient time exists to perform the page migration based on at least latency tolerance 181 of device 156. In operation 320, migration control 116 performs the page migration, based on at least determining that sufficient time exists to perform the page migration. In some examples, virtual object 110 performs the page migration (e.g., migration control 116 is at least partially within OS 114 and/or application 112). In some examples, hypervisor 160, managing virtual object 110, performs the page migration (e.g., migration control 116 is at least partially within hypervisor 160). The page migration is performed according to flowchart 200, in some examples. Flowchart 300 returns to operation 302 and awaits another page migration.

Figure 4:
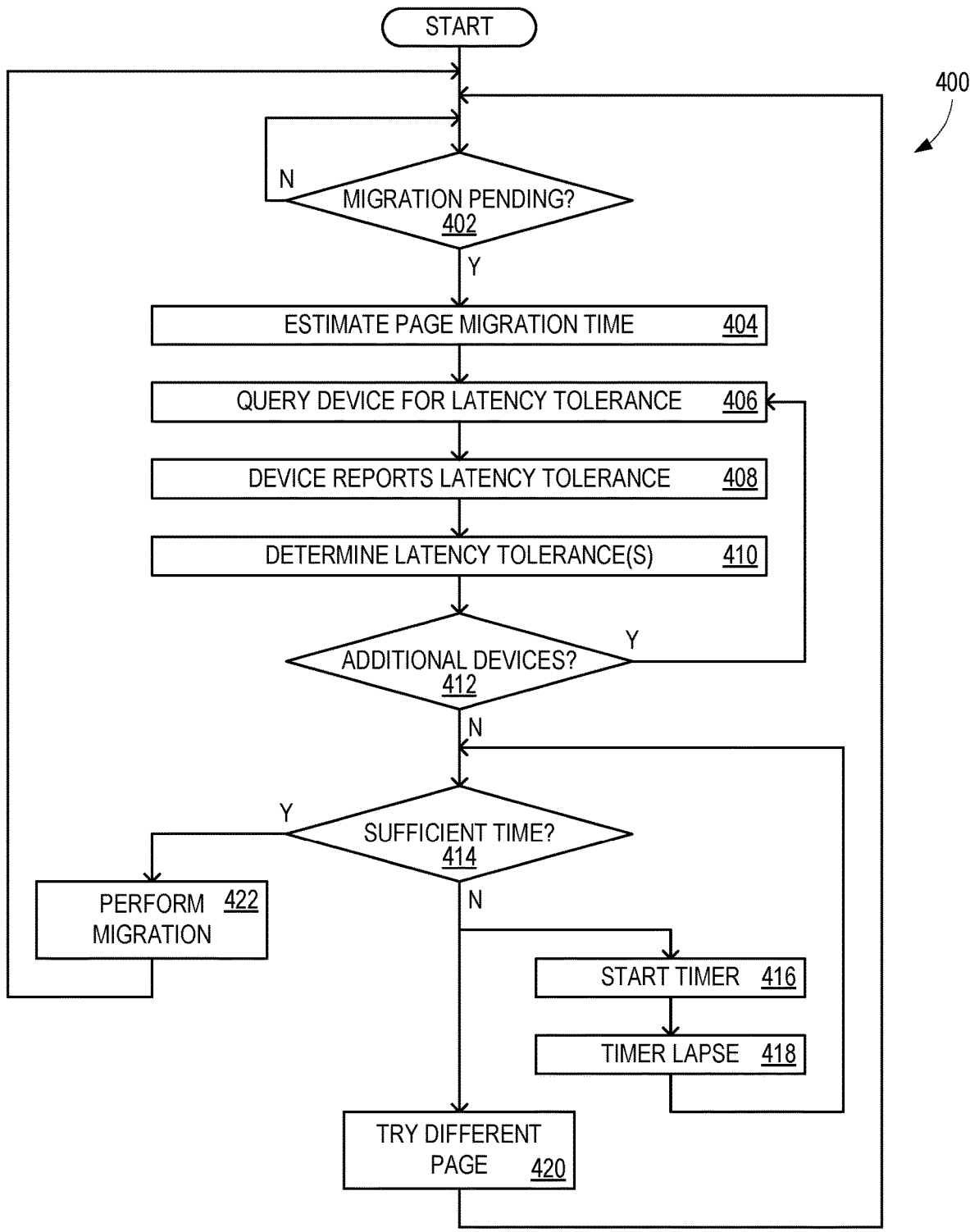

FIG. 4 shows a flowchart 400 illustrating exemplary page migration operations using latency tolerance, as may be performed using examples of architecture 100. In some examples, operations described for flowchart 400 are performed by computing device 900 of FIG. 9. Flowchart 400 is used for scenarios of one or multiple devices coupled to virtual object 110 (e.g., device 156 and, in some cases also device 158), the software (e.g., application 112, OS 114, or hypervisor 160) pulling latency tolerances from coupled devices, the decision of proceeding with the page migration being performed by software (e.g., application 112, OS 114, or hypervisor 160), and software (e.g., application 112, OS 114, or hypervisor 160) performing the page migration.

Flowchart 400 commences with decision operation 402 determining a pendency of a page migration of a memory page for virtual object 110. While no page migrations are pending, flowchart 400 returns to cycle through decision operation 402. When migration control 116 becomes aware of a pending page migration, operation 404 estimates an amount of time required for the page migration, based on at least a prior page migration.

In operation 406, migration control 116 queries device 156 (and, if needed, device 158) for latency tolerance, thereby pulling latency tolerance information from all relevant devices. Device 156 reports latency tolerance 181 of device 156 in operation 408. In some examples, operation 408 includes, based on a trigger condition, reporting, by device 156, latency tolerance 181 of device 156. In some examples, the trigger condition comprises a query (from migration control 116).

Operation 410 determines latency tolerance 181 of device 156 coupled to virtual object 110, which in some examples comprises determining latency tolerance 181 based on at least a report by device 156. Each relevant device is queried, so the latency tolerance may be determined. For example, if decision operation 412 determines that device 158 is also affected by the page migration, flowchart 400 returns to operation 406 so that device 158 is queried and responds.

When all devices have been queried, flowchart moves to decision operation 414, to determine whether sufficient time exists to perform the page migration. Similarly to flowchart 300, a determination may be made regarding whether multiple page migrations may be performed contemporaneously, and if so, the count.

If there is insufficient time, flowchart either moves to operation 416 or 420. Operation 416 starts timer 162, based on at least determining that sufficient time does not exist to perform the page migration. Timer 162 lapses in operation 418, and flowchart 400 moves back to decision operation 414 to, based on a lapse of timer 162, determine whether sufficient time exists to perform the page migration. Alternatively, some examples move to operation 420 to try a different page migration, and back up to decision operation 402 to determine a pendency of a different page migration of a memory page for virtual object 110.

If, however, there is sufficient time, decision operation 414 determines that sufficient time exists to perform the page migration, based on at least latency tolerance 181 of device 156. In operation 422, migration control 116 performs the page migration according to flowchart 200, in some examples, based on at least determining that sufficient time exists to perform the page migration. In some examples, virtual object 110 or hypervisor 160 performs the page migration. Flowchart 400 returns to decision operation 402 to await another page migration.

Figure 5:
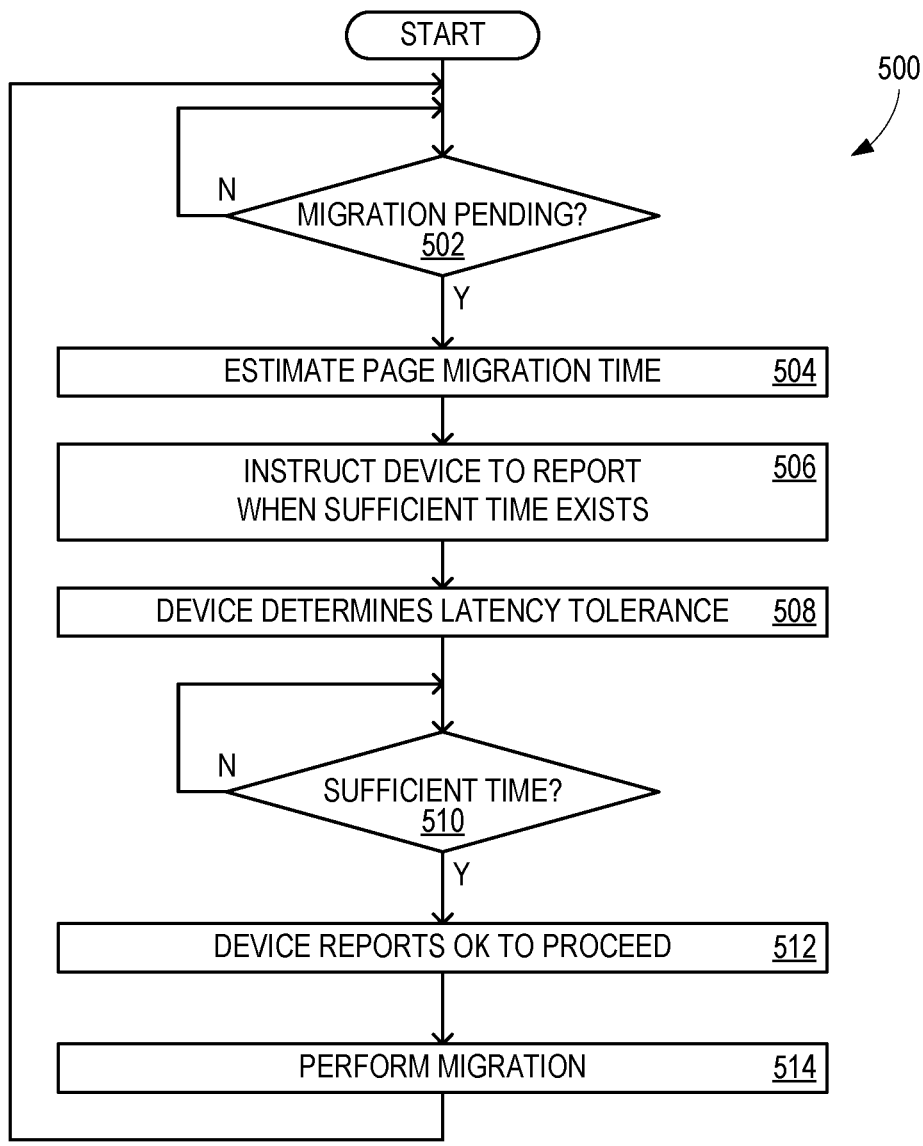

FIG. 5 shows a flowchart 500 illustrating exemplary page migration operations using latency tolerance, as may be performed using examples of architecture 100. In some examples, operations described for flowchart 500 are performed by computing device 900 of FIG. 9. Flowchart 500 is used for scenarios of a single device coupled to virtual object 110 (e.g., device 156 and, in some cases also device 158), the software (e.g., application 112, OS 114, or hypervisor 160) instructing the coupled device to alert the software when sufficient time exists, and software (e.g., application 112, OS 114, or hypervisor 160) performing the page migration.

Flowchart 500 commences with decision operation 502 determining a pendency of a page migration of a memory page for virtual object 110. While no page migrations are pending, flowchart 500 returns to cycle through decision operation 502. When migration control 116 becomes aware of a pending page migration, operation 504 estimates an amount of time required for the page migration, based on at least a prior page migration.

In operation 506, migration control 116 instructs device 156 to provide an alert when sufficient time exists to perform the page migration. In some examples, migration control 116 provides the time estimate for the page migration to device 156. In operation 506, device 156 determines latency tolerance 181, and in decision operation 510, device 156 determines whether sufficient time exists to perform the page migration. If not, flowchart 500 cycles through decision operation 510 until sufficient time does exist.

When decision operation 510 determines that sufficient time exists to perform the page migration, based on at least latency tolerance 181 of device 156, flowchart 500 moves to operation 512. In operation 512, device 156 reports to migration control 116 (in virtual object 110 and/or hypervisor 160) that sufficient time exists (e.g., latency tolerance 181 of device 156 is sufficient to perform the page migration), and the page migration may proceed. In some examples, the reporting of operation 512 is based on a trigger condition, such as a change in latency tolerance 181 of device 156.

In operation 514, migration control 116 performs the page migration according to flowchart 200, based on at least determining that sufficient time exists to perform the page migration. In some examples, virtual object 110 or hypervisor 160 performs the page migration. Flowchart 500 returns to decision operation 502 to await another page migration.

Figure 6:
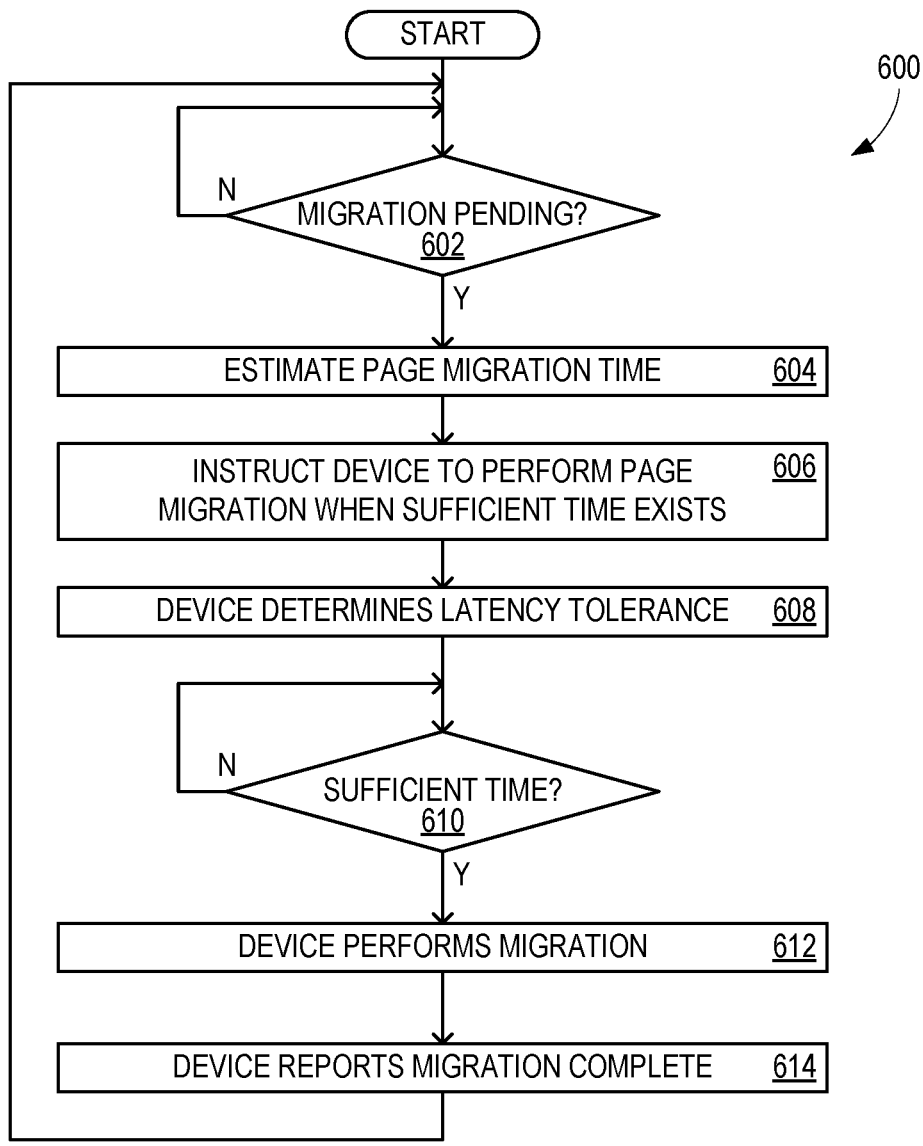

FIG. 6 shows a flowchart 600 illustrating exemplary page migration operations using latency tolerance, as may be performed using examples of architecture 100. In some examples, operations described for flowchart 600 are performed by computing device 900 of FIG. 9. Flowchart 600 is used for scenarios of one or more devices coupled to virtual object 110 (e.g., device 156 and, in some cases also device 158), the software (e.g., application 112, OS 114, or hypervisor 160) instructing the coupled device to determine when sufficient time exists, and the coupled device performing the page migration.

Flowchart 600 commences with decision operation 602 determining a pendency of a page migration of a memory page for virtual object 110. While no page migrations are pending, flowchart 600 returns to cycle through decision operation 602. When migration control 116 becomes aware of a pending page migration, operation 604 estimates an amount of time required for the page migration, based on at least a prior page migration.

In operation 606, migration control 116 instructs device 156 to perform the page migration subject to sufficient time existing to perform the page migration. In some examples, migration control 116 provides the time estimate for the page migration to device 156. In operation 606, device 156 determines latency tolerance 181, and in decision operation 610, device 156 determines whether sufficient time exists to perform the page migration. If not, flowchart 600 cycles through decision operation 610 until sufficient time does exist.

When decision operation 610 determines that sufficient time exists to perform the page migration, based on at least latency tolerance 181 of device 156, flowchart 600 moves to operation 612. In operation 612, device 156 performs the page migration according to flowchart 200, in some examples, based on at least determining that sufficient time exists to perform the page migration. In operation 614, device 156 reports completion of the page migration to virtual object 110. Flowchart 600 returns to decision operation 502 to await another page migration.

Figure 7:
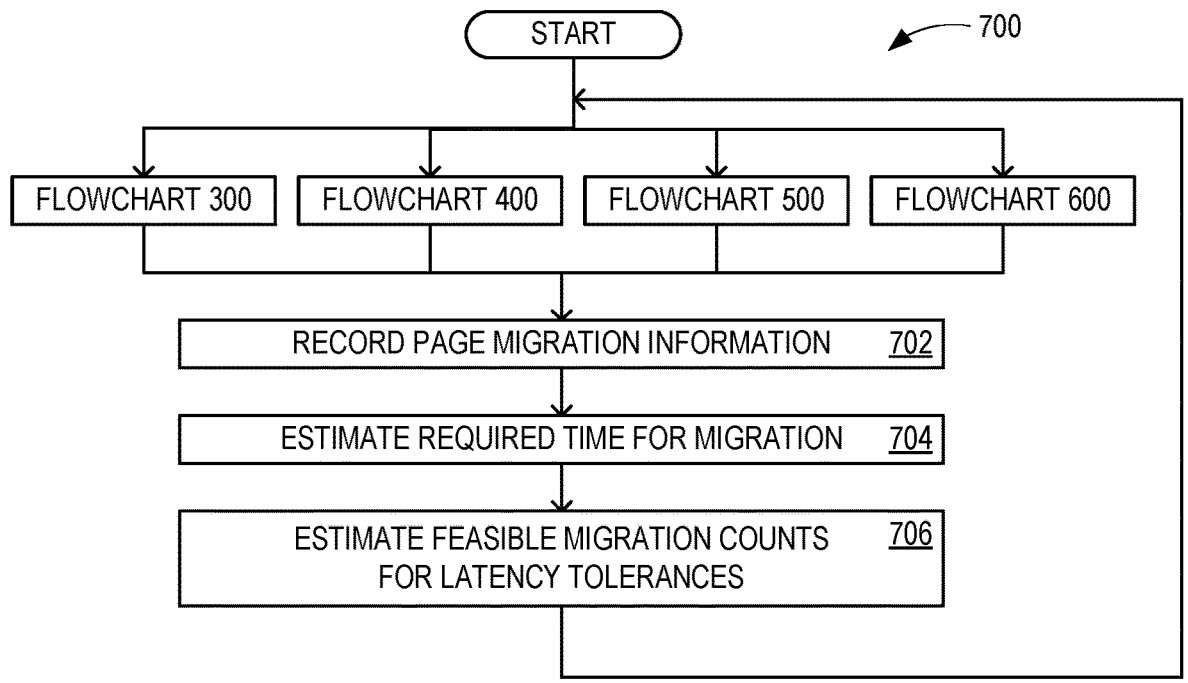
FIGS. 7-8 show flowcharts illustrating exemplary operations that may be performed using examples of the architecture of FIG. 1.

FIG. 7 shows a flowchart 700 illustrating exemplary page migration operations using latency tolerance, as may be performed using examples of architecture 100. In some examples, operations described for flowchart 700 are performed by computing device 900 of FIG. 9. Flowchart 700 commences after at least one of flowcharts 300, 400, 500, or 600 has iterated at least once, in order to provide historical data for page migration information 166 (or initial estimates may be used, in some examples). Operation 702 records page migration information 166 for use by ML component 164.

In operation 704, ML component 164 estimates the amount of time required for a page migration, based on at least a prior page migration (identified in page migration information 166). In some examples, the amount of time required for a page migration (e.g., to mitigate the risk of a buffer overflow) depends on the device type. For example, ML component 164 may learn the weighted combination of latency tolerance 181 and latency tolerance 182 to use in decision operations 312, 414, 510, and 610.

In operation 706, ML component 164 determines the count of the plurality of contemporaneous page migrations that may be performed for a latency tolerance. In general the longer a latency tolerance, the higher the count of contemporaneous page migrations that may be performed.

The time cost to migrate memory pages includes a fixed time, or a relatively fixed time, for redirecting pointers, and ceasing and resuming access (e.g., operations 202, 206, and 208 of flowchart 200), and also a variable time for copying memory pages (operation 204 of flowchart 200). That is, multiple sets of pointers may be redirected, and cease and resume instructions may be issued for multiple contemporaneous page migrations without a significant time difference over what would be required for only a single page migration.

However, the copying of memory pages may grow noticeably with multiple contemporaneous page migrations over the time required for only a single page migration. Performing multiple contemporaneous page migrations may be more efficient in some examples. Thus, some examples of architecture 100 perform multiple contemporaneous page migrations when latency tolerance permits, and ML component 164 determines the count for a given latency tolerance.

Figure 8:
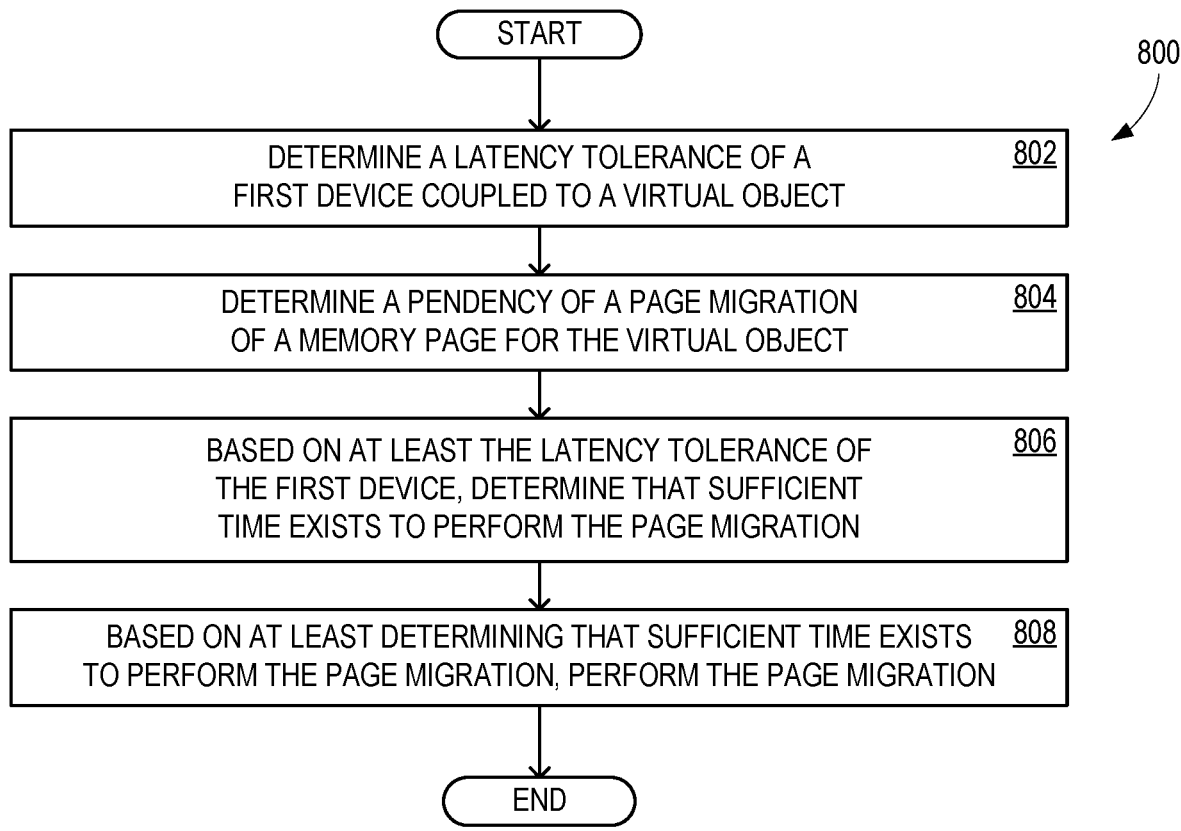

FIG. 8 shows a flowchart 800 illustrating exemplary operations associated with architecture 100. In some examples, operations described for flowchart 800 are performed by computing device 900 of FIG. 9. Flowchart 800 commences with operation 802, which includes determining a latency tolerance of a first device coupled to a virtual object.

Operation 804 includes determining a pendency of a page migration of a memory page for the virtual object. Operation 806 includes, based on at least the latency tolerance of the first device, determining that sufficient time exists to perform the page migration. Operation 808 includes, based on at least determining that sufficient time exists to perform the page migration, performing the page migration.

Additional Examples

An example system comprises: a processor; and a computer-readable medium storing instructions that are operative upon execution by the processor to: determine a latency tolerance of a first device coupled to a virtual object; determine a pendency of a page migration of a memory page for the virtual object; based on at least the latency tolerance of the first device, determine that sufficient time exists to perform the page migration; and based on at least determining that sufficient time exists to perform the page migration, performing the page migration.

An example computerized method comprises: determining a latency tolerance of a first device coupled to a virtual object; determining a pendency of a page migration of a memory page for the virtual object; based on at least the latency tolerance of the first device, determining that sufficient time exists to perform the page migration; and based on at least determining that sufficient time exists to perform the page migration, performing the page migration.

One or more example computer storage devices have computer-executable instructions stored thereon, which, on execution by a computer, cause the computer to perform operations comprising: determining a latency tolerance of a first device coupled to a virtual object; determining a pendency of a page migration of a memory page for the virtual object; based on at least the latency tolerance of the first device, determining that sufficient time exists to perform the page migration; and based on at least determining that sufficient time exists to perform the page migration, performing the page migration.

Alternatively, or in addition to the other examples described herein, examples include any combination of the following:

- determining the latency tolerance of the first device comprises determining the latency tolerance by the first device;
- determining the latency tolerance of the first device comprises determining the latency tolerance based on at least a report by the first device;
- determining a latency tolerance of a second device;
- determining whether sufficient time exists to perform the page migration;
- based on at least the latency tolerance of the first device and the latency tolerance of the second device, determining whether sufficient time exists to perform the page migration;
- based on at least a prior page migration, estimating an amount of time required for the page migration;
- based on at least determining that sufficient time does not exist to perform the page migration, starting a timer;
- based on a lapse of the timer, determining whether sufficient time exists to perform the page migration;
- instructing the first device to perform the page migration subject to sufficient time existing to perform the page migration;
- instructing the first device to provide an alert when sufficient time exists to perform the page migration;
- the virtual object comprises a VM;
- the virtual object is coupled to the at least one device through a host memory;
- the first device comprises at least one device selected from the list consisting of a network adapter, an audio device, a video device, and a media controller;
- the first device comprises a peripheral device external to the virtual object;
- the first device comprises a PCIe device;
- the virtual object queries at least one coupled device for its latency tolerance;
- reporting, by the first device, the latency tolerance of the first device;
- based on a trigger condition, reporting, by the first device, the latency tolerance of the first device;
- the trigger condition comprises a lapse of the timer;
- the trigger condition comprises a change in the latency tolerance of the first device;
- the trigger condition comprises a query;
- reporting the latency tolerance of the first device comprises sending an interrupt signal;
- the report by the first device comprises an LTR report;
- an application executing within the virtual object determines the latency tolerance;
- an OS of the virtual object determines the latency tolerance;
- a hypervisor managing the virtual object determines the latency tolerance;
- determining whether sufficient time exists comprises determining whether sufficient time exists based on at least a most restrictive one of the latency tolerance of the first device and the latency tolerance of the second device;
- determining whether sufficient time exists comprises determining whether sufficient time exists based on at least a weighted combination of the latency tolerance of the first device and the latency tolerance of the second device;
- determining whether sufficient time exists comprises determining whether sufficient time exists based on at least an average of latency tolerances of a plurality of devices coupled to the virtual object;
- the average comprises a mean;
- the average comprises a median;
- the memory page comprises an integer multiple of 4096 bytes;
- based on at least a prior page migration, estimating, by an ML component, the amount of time required for the page migration;
- the virtual object performs the page migration;
- the hypervisor managing the virtual object performs the page migration;

instructing the first device to perform the page migration;
the first device performs the page migration;
reporting, by the first device, to the virtual object, completion of the page migration;
based on at least determining that sufficient time exists to perform the page migration, determining whether sufficient time exists to perform a second page migration contemporaneously;
based on at least the latency tolerance of the first device, determining whether sufficient time exists to perform a plurality of page migrations contemporaneously;
based on at least determining that sufficient time exists to perform a plurality of contemporaneous page migrations, performing the plurality of page migrations contemporaneously;
based on at least the latency tolerance of the first device, determining a count of the plurality of contemporaneous page migrations that may be performed contemporaneously; and
based on at least a prior page migration, determining, by the ML component, the count of the plurality of contemporaneous page migrations that may be performed for a latency tolerance.

While aspects of the disclosure have been described in terms of various examples with their associated operations, a person skilled in the art would appreciate that a combination of operations from any number of different examples is also within scope of the aspects of the disclosure.

Example Operating Environment

Figure 9:
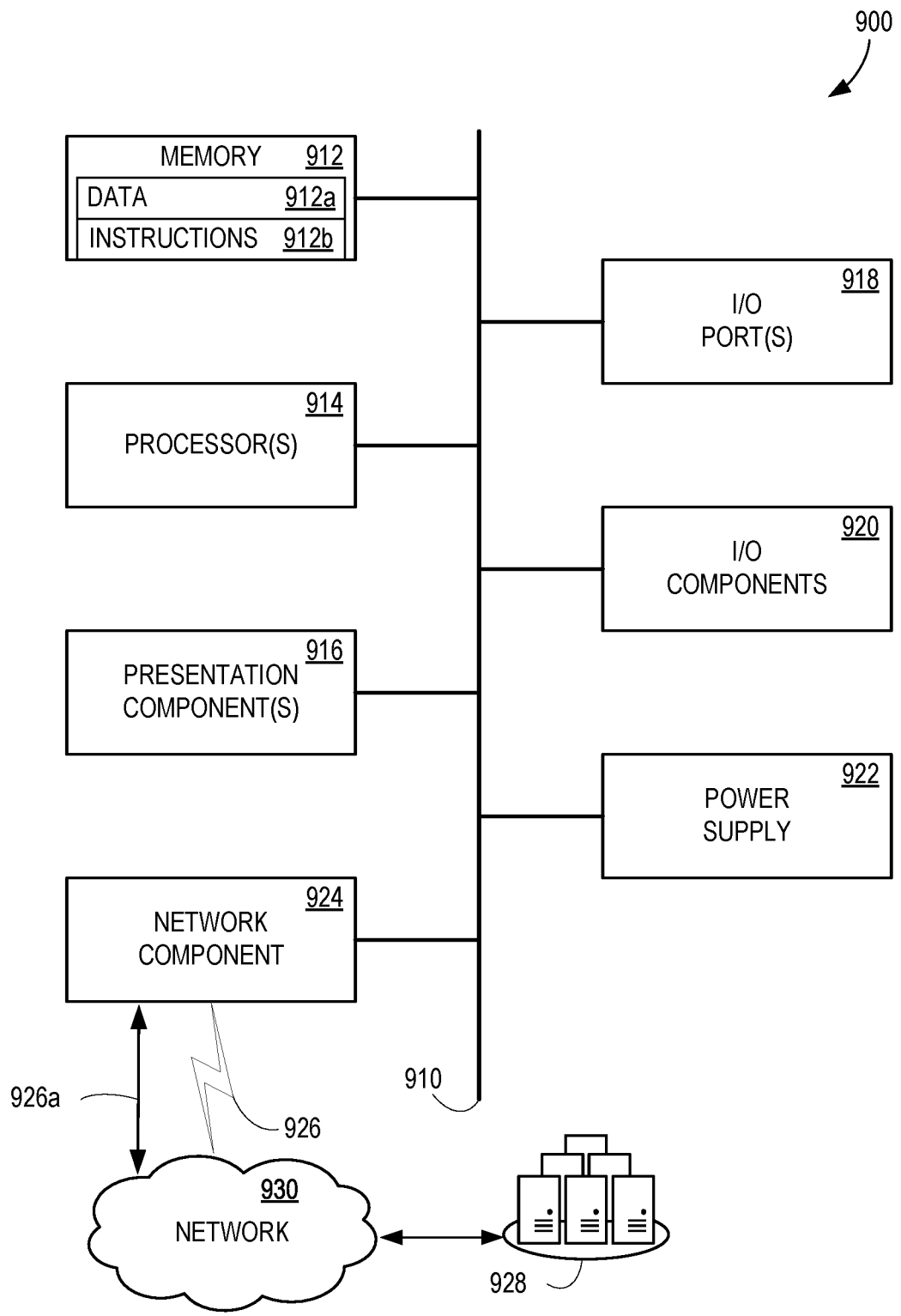
FIG. 9 shows a block diagram of an example computing environment suitable for implementing some of the various examples disclosed herein.

FIG. 9 is a block diagram of an example computing device 900 for implementing aspects disclosed herein, and is designated generally as computing device 900. In some examples, one or more computing devices 900 are provided for an on-premises computing solution. In some examples, one or more computing devices 900 are provided as a cloud computing solution. In some examples, a combination of on-premises and cloud computing solutions are used. Computing device 900 is but one example of a suitable computing environment and is not intended to suggest any limitation as to the scope of use or functionality of the examples disclosed herein, whether used singly or as part of a larger set.

Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: computer storage memory 912, one or more processors 914, one or more presentation components 916, input/output (I/O) ports 918, I/O components 920, a power supply 922, and a network component 924. While computing device 900 is depicted as a seemingly single device, multiple computing devices 900 may work together and share the depicted device resources. For example, memory 912 may be distributed across multiple devices, and processor(s) 914 may be housed with different devices.

Bus 910 represents what may be one or more busses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer storage media referenced below and operatively provide storage of computer-readable instructions, data structures, program modules and other data for the computing device 900. In some examples, memory 912 stores one or more of an operating system, a universal application platform, or other program modules and program data. Memory 912 is thus able to store and access data 912a and instructions 912b that are executable by processor 914 and configured to carry out the various operations disclosed herein.

In some examples, memory 912 includes computer storage media. Memory 912 may include any quantity of memory associated with or accessible by the computing device 900. Memory 912 may be internal to the computing device 900 (as shown in FIG. 9), external to the computing device 900 (not shown), or both (not shown). Additionally, or alternatively, the memory 912 may be distributed across multiple computing devices 900, for example, in a virtualized environment in which instruction processing is carried out on multiple computing devices 900. For the purposes of this disclosure, "computer storage media," "computer-storage memory," "memory," and "memory devices" are synonymous terms for the computer-storage memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to the client computing device 900. In some examples, the processor(s) 914 are programmed to execute instructions such as those illustrated in the flow charts discussed below and depicted in the accompanying drawings. Moreover, in some examples, the processor(s) 914 represent an implementation of analog techniques to perform the operations described herein. For example, the operations may be performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

Computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication link 926 and/or a wired communication link 926a to a remote resource 928 (e.g., a cloud resource) across network 930. Various different examples of communication links 926 and 926a include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a computer-readable medium storing instructions that are operative upon execution by the processor to:
   determine that a first device is coupled to a virtual object through host memory;

based on the first device being coupled to the virtual object through the host memory, determine a latency tolerance of the first device, the latency tolerance being an amount of time the first device can tolerate being paused without excessive risk of a buffer overflow event or missing latency targets for network transfers;
identify a page migration of a memory page for the virtual object, wherein:
the page migration is pending in a page migration queue;
the page migration identifies a source page and a target page, the source page and the target page being host memory locations of the system; and
the page migration involves copying contents of the source page to the target page; and
based on the latency tolerance of the first device, determine whether sufficient time exists to migrate an individual page of host memory;
when sufficient time exists to migrate an individual page of host memory, perform the page migration; and
when sufficient time does not exist to migrate an individual page of host memory, start a timer and based on an expiration of the timer, determine again whether sufficient time exists to perform the page migration.

2. The system of claim 1, wherein determining the latency tolerance of the first device comprises:
determining the latency tolerance by the first device; or
determining the latency tolerance based on at least a report by the first device.

3. The system of claim 1, wherein the instructions are further operative to:
determine a latency tolerance of a second device; and
based on at least the latency tolerance of the first device and the latency tolerance of the second device, determine whether sufficient time exists to perform the page migration.

4. The system of claim 1, wherein the instructions are further operative to, based on a prior page migration, estimate an amount of time required for the page migration, wherein the amount of time required for the page migration is used in the determining whether sufficient time exists to perform the page migration.

5. The system of claim 1, wherein the determining of whether sufficient time exists to perform the page migration is additionally based on an expected page migration operation duration that is based on historical write times.

6. The system of claim 1, wherein the instructions are further operative to instruct the first device to perform the page migration subject to sufficient time existing to perform the page migration; wherein, based on the instructing of the first device:
the determining whether sufficient time exists is performed by the first device; and
the performing of the page migration is by the first device.

7. The system of claim 1, wherein the instructions are further operative to instruct the first device to provide an alert when sufficient time exists to perform the page migration, wherein, based on the instructing of the first device:
the determining whether sufficient time exists is performed by the first device; and
the performing of the page migration is in response to receiving the alert from the first device.

8. A computerized method comprising:
determining that a first device is coupled to a virtual object through host memory;
based on the determining that the first device coupled to the virtual object through the host memory, determining a latency tolerance of the first device, the latency tolerance being an amount of time the first device can tolerate being paused without excessive risk of a buffer overflow event or missing latency targets for network transfers;
identifying a first page migration of a first memory page for the virtual object, wherein:
the first page migration is pending in a page migration queue;
the first page migration identifies a first source page and a first target page, the first source page and the first target page being host memory locations; and
the first page migration involves copying first contents of the first source page to the first target page;
based on the latency tolerance of the first device, determining that sufficient time exists to migrate an individual page of host memory; and
based on determining that sufficient time exists to migrate an individual page of host memory, performing the first page migration;
identifying a second page migration of a second memory page for the virtual object, wherein:
the second page migration is pending in the page migration queue;
the second page migration identifies a second source page and a second target page, the second source page and the second target page being host memory locations; and
the second page migration involves copying second contents of the second source page to the second target page; and
based on a new current latency tolerance of the first device, determining that sufficient time does not exist to migrate a second individual page of host memory, and responsive thereto, delaying performance of the second page migration for at least a period of time.

9. The method of claim 8, wherein determining the latency tolerance of the first device comprises:
determining the latency tolerance by the first device; or
determining the latency tolerance based on at least a report by the first device.

10. The method of claim 8, further comprising:
determining a latency tolerance of a second device; and
based on at least the latency tolerance of the first device and the latency tolerance of the second device, determining whether sufficient time exists to perform the first page migration.

11. The method of claim 8, further comprising, based on a prior page migration, estimating an amount of time required for the first page migration, wherein the amount of time required for page migration is used in the determining whether sufficient time exists to perform the first page migration.

12. The method of claim 8, wherein the delaying of the second page migration comprises:
starting a timer; and
based on an expiration of the timer, determining whether sufficient time exists to perform the second page migration and if so, performing the second page migration.

13. The method of claim 8, further comprising instructing the first device to perform the first page migration subject to sufficient time existing to perform the first page migration, wherein, based on the instructing of the first device:
the determining of whether sufficient time exists is performed by the first device; and
the performing of the first page migration is by the first device.

14. The method of claim 8, further comprising instructing the first device to provide an alert when sufficient time exists to perform the first page migration wherein the performing of the page migration is in response to receiving the alert from the first device.

15. One or more computer storage devices having computer-executable instructions stored thereon, which, on execution by a computer, cause the computer to perform operations comprising:
   determining that a first device is coupled to a virtual object through host memory;
   based on the determining that the first device is coupled to the virtual object through the host memory, determining a latency tolerance of the first device, the latency tolerance being an amount of time the first device can tolerate being paused without excessive risk of a buffer overflow event or of missing latency targets for network transfers;
   identify a page migration of a memory page for the virtual object, wherein:
   the page migration is pending in a page migration queue;
   the page migration identifies a source page and a target page, the source page and the target page being host memory locations; and
   the page migration involves copying contents of the source page to the target page;
   based on the latency tolerance of the first device, determining whether sufficient time exists to migrate an individual page of host memory;
   based on determining that sufficient time exists to migrate an individual page of host memory, performing the page migration; and
   based on determining that sufficient time does not exist to migrate an individual page of host memory, delaying the page migration until sufficient time exists to perform the page migration.

16. The one or more computer storage devices of claim 15, wherein determining the latency tolerance of the first device comprises:
   determining the latency tolerance by the first device; or
   determining the latency tolerance based on at least a report by the first device.

17. The one or more computer storage devices of claim 15, wherein the operations further comprise:
   determining a latency tolerance of a second device; and
   based on at least the latency tolerance of the first device and the latency tolerance of the second device, determining whether sufficient time exists to perform the page migration.

18. The one or more computer storage devices of the one or more computer storage devices of wherein the operations further comprise based on a prior page migration, estimating an amount of time required for the page migration, wherein the amount of time required for page migration is used in the determining whether sufficient time exists to perform the page migration.

19. The one or more computer storage devices of claim 15, wherein the delaying of the page migration comprises:
   starting a timer; and
   based on an expiration of the timer, determining whether sufficient time exists to perform the page migration.

20. The one or more computer storage devices of claim 15, wherein the operations further comprise instructing the first device to perform the page migration subject to sufficient time existing to perform the page migration, wherein, based on the instructing of the first device:
   the determining whether sufficient time exists is performed by the first device; and
   the performing of the page migration is by the first device.

* * * * *